March 31, 1964  J. MORRIS  3,127,500
WELDING TUBULAR MEMBERS OF FINITE LENGTH
Filed Feb. 19, 1962
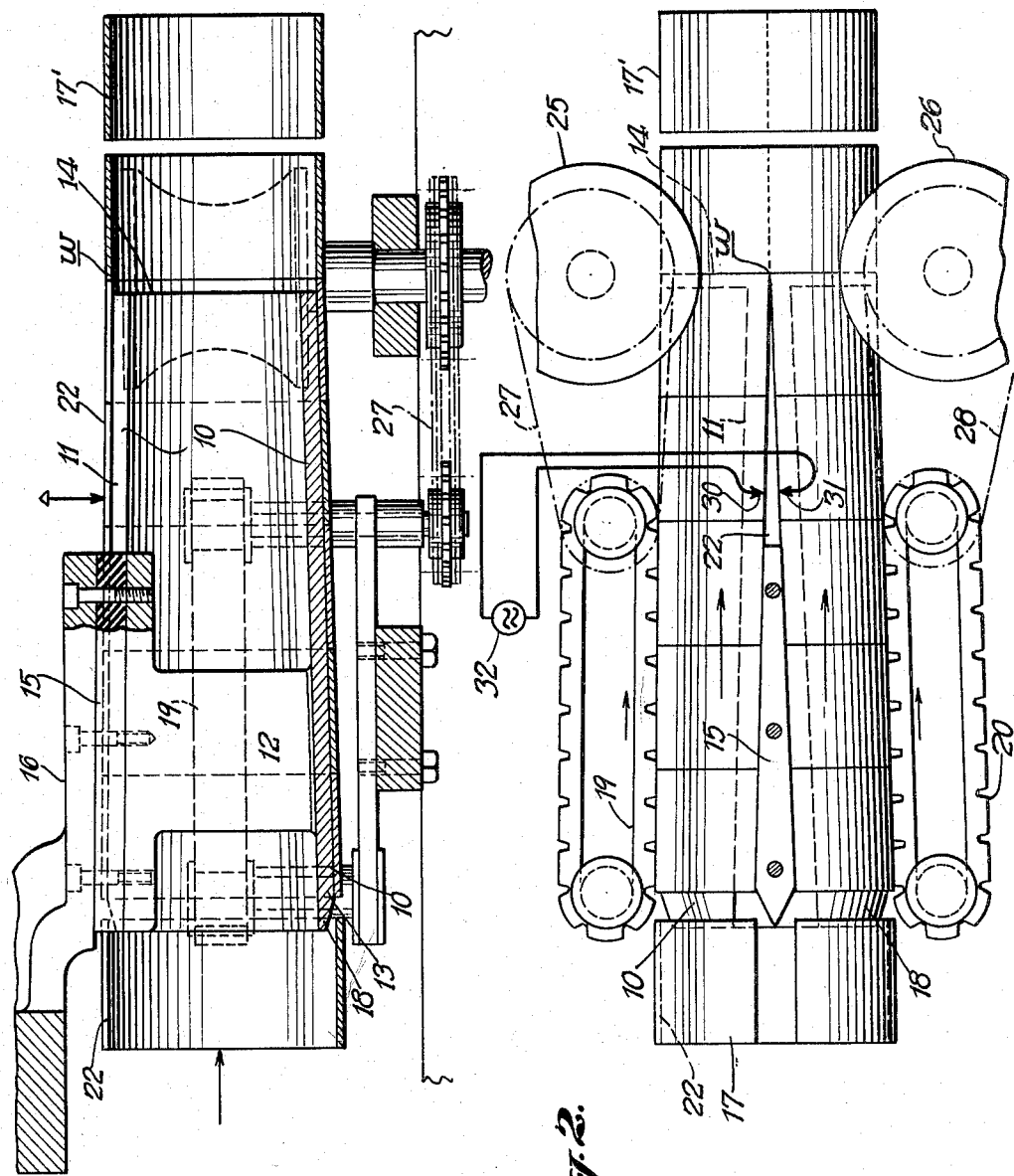
INVENTOR.
JACK MORRIS.
BY
Ward, Neal, Haselton, Orme, & McElhannon
ATTORNEYS.

United States Patent Office 3,127,500
Patented Mar. 31, 1964

3,127,500
WELDING TUBULAR MEMBERS OF
FINITE LENGTH
Jack Morris, Monsey, N.Y., assignor to American Machine & Foundry Company, New York, N.Y., a corporation of New Jersey
Filed Feb. 19, 1962, Ser. No. 173,871
5 Claims. (Cl. 219—59)

This invention relates to the welding together of the opposed edges of pairs of metal portions or elements of finite length by the use of high frequency electrical heating current for heating such edges up to welding temperature upon their approach to a weld point, at which point the metal portions are welded together under pressure to provide a seam which is welded throughout from a point substantially at the forward end thereof and substantially to the trailing end thereof.

The invention is particularly adapted for forming a welded seam in short or finite length tubular members such, for example, as cylinders or other tubular articles as used for forming fluid tanks, as an example, or generally annular members which are in a sense tubular, such as wheel rims, hoops and the like and which initially have a gap, the edges of which are to be welded together. The invention may also be used to weld together elements such as strip-like portions of metal elements of finite length which do not necessarily form a part of a length of tubing or of a rim, hoop or the like.

United States patent to Rudd et al. No. 2,818,488, granted December 31, 1957, reference to which is hereby made, relates to a method of welding by the use of high frequency electrical current applied by contacts to the opposite sides of a V-shaped gap formed on rapidly advancing tubing, the gap of which is to be welded together and the edges of which are heated to welding temperature at a desired weld point by current flowing from the contacts along the gap edges to and from the weld point where pressure is applied on opposite sides of the tubing to force the gap edges into welded relation at the weld point. The particular form of the apparatus disclosed in said patent is adapted for longitudinally welding gaps in tubing or the like generally of relatively extensive lengths such that it is relatively unimportant that the welded seam does not start to form at the very forward end of the workpiece or extend to the very trailing end thereof. The present invention involves the use of features of said patent as improved, adapted and supplemented particularly for the welding of seams of finite length throughout from substantially the forward ends to the trailing ends thereof, thereby enabling the invention to be utilized for welding the gaps not only in short tubing, but also in elements such as wheel rims or hoops and the like, all of which, for convenience, may be sometimes referred to hereinafter as "tubular members of finite length."

In accordance with the present invention, the workpieces which are provided with a gap, the edges of which are to be welded together, are advanced along in substantially embracing relationship upon a mandrel which is tapered to smaller dimensions in the direction of such advance, such mandrel or mandrel-like means preferably also being formed with a longitudinally-extending gap, and the workpieces being so positioned that the gaps thereof are in general alignment with the gap in the mandrel. Further, in accordance with the invention, the workpieces which are to be welded are placed on such mandrel structure and urged under pressure, each against the next, by suitable means therealong and as each point on the edges of the gaps of the workpieces arrives at a weld point, the workpieces are subjected to pressure from opposite sides, causing the gap to close at the weld point, while in advance of the weld point, high frequency currents are caused to flow along on the gap edges for heating same to welding temperature so that they become welded at the weld point and are then forced along and passed off the forward end of the mandrel means. The means for urging the workpieces along on the mandrel preferably is arranged to do so at a speed such as to cause the workpieces to be crowded in succession under pressure, each one against the next as they reach the welding region where the gap edges are caused to be closed by the pressure applied to opposite sides.

Various further and more specific objects, features and advantages of the invention will appear from the description given below, taken in connection with the accompanying drawings, illustrating by way of example a preferred form of the invention.

In the drawings:

FIG. 1 shows somewhat schematically a longitudinally-extending vertical sectional view of one form of the apparatus embodying the invention; and FIG. 2 is a plan view of the same.

Referring to the drawings in further detail, an elongated hollow mandrel is shown at 10 formed preferably of non-magnetic metal, and preferably having a longitudinally-extending gap, as indicated at 11, through which suitable bracket means as at 12 may extend down and be affixed to the lower inside surface of the mandrel for supporting same rigidly in a stationary position. As shown, the mandrel is tapered externally at least, and preferably uniformly to smaller and smaller diameters from its rear end portion, as indicated at 13, to its smaller forward end portion indicated at 14. Suitable seam guide means, formed for example of wear-resistant insulating material may be provided as at 15, the bracket 12 being connected as by screw means to the underside thereof and the upper side thereof being supported as by a bracket portion 16. As indicated in FIG. 2, the seam guide means 15 is preferably tapered with a taper corresponding to the angular relation of the edges in the workpieces to be welded, as hereinafter explained.

The workpieces which are to be welded, for example, a succession of annular tubular members of finite length such as wheel rims or bands as indicated at 17, are placed one after another upon the tapered rear end 18 of the mandrel and same are there gripped by suitable means such as socalled caterpillar-type belt arrangements as indicated at 19 and 20, positioned at opposite sides of the assembly and engaging the opposite sides of the workpieces so as to crowd and urge the same in succession one after another along on the mandrel while compressing same to the extent permitted by the taper of the mandrel so that the gaps as at 22 in each of the workpieces become gradually more nearly closed, and so that the edges thereof form a V-shaped gap in advance of a weld point $w$ where such edges come together and are welded under pressure applied for example from opposite sides by pressure rollers as at 25, 26. These rollers may be suitably belted, or otherwise interconnected with the caterpillar belt arrangements 19, 20 respectively, as by belt and gear or sprocket means such as schematically indicated at 27, 28 and such that the speed of movement along the surfaces of the caterpillar belts where they engage the workpieces, will tend to be slightly greater than the speed of movement of the peripheries of the pressure rollers 25, 26 where they engage the workpieces. Thus the caterpillar belt arrangements will constantly urge the succession of workpieces under pressure into positions between the pressure rollers, whereby the gaps in the workpieces collectively in conjunction will the seam guide means 15, form a continuing gap of narrow V-shape, with its apex at the weld point.

The edges of this gap are heated in advance of the weld point gradually up to welding temperature as by the use of contacts as at 30, 31, connected respectively to the terminals of a suitable source of high frequency current as at 32 having for example a frequency preferably above 50,000 cycles per second, or more commonly in the range of 300,000 to 400,000 cycles per second. High frequency current as thus applied, as explained in the prior patent above referred to, will cause the edges of the V-shaped gap in the workpieces to become heated only upon the very surfaces thereof up to welding temperature so that the metal to any substantial depth in back of said surfaces remains firm, whereby the pressure rollers may cause the gap edges to become firmly pressed together to form a good so-called "forged" type of weld with very little, if any, fused metal between the welded surfaces, and with substantially a minimum of upset of fused metal.

In order that the forward end edges of the gap in the first one of the workpieces which is passed through the equipment, will have opportunity to become heated to welding temperature upon arrival at the weld point, that is, in order to provide a path for the current flowing from the contacts along on said edges to and from the weld point before said edges reach the weld point, such first workpiece may be preceded by a "dummy" workpiece having a gap which becomes closed at the weld point and the edges of which gap will provide the necessary current paths back to the edges of the gap in the first of the actual workpieces to be welded. Alternatively, the first of the workpieces may be allowed to pass through the equipment with the forward portions of its seam unwelded, and this piece may be discarded with a view thereafter to passing a large number of useful, completely welded workpieces through the equipment with the welded seams of each starting on the very forward ends of the gap edges thereof. Similarly, at the trailing end of the succession of workpiece, a "dummy" workpiece may be added to continue the current paths from the contacts 30, 31 to the very trailing ends of the gap edges of the last useful workpiece until such edges come together at the weld point, or, if preferred, the final workpiece may be discarded if its seam is not welded as desired to the trailing end thereof.

As indicated at the right hand ends of the figures, the completed welded workpieces, as at 17' will finally be thrust free of the forward end of the mandrel by the succeeding workpieces.

As to various aspects of the apparatus and method involving the present invention and which may not be fully explained herein, reference may be had to the above-mentioned prior U.S. Patent No. 2,818,488. It may also be noted that in some cases it will be desirable to embody a so-called impeder to extend along within the workpieces at the region of the heating and welding, to impede the flow of high frequency current in directions around the back or underside of the workpieces and mandrel and to cool the various internal portions of the mandrel. This may be accomplished by following the teachings of United States patent to Stanton et al. No. 2,833,910, granted May 6, 1958, and United States application of Robert J. Stanton, Serial No. 781,060, filed December 17, 1958, now Patent No. 3,054,883. Alternative arrangements for applying high frequency current may also be utilized, as disclosed in the United States patent to Rudd et al., No. 2,857,503, granted October 21, 1958, and furthermore, if desired, the parts may be so designed and arranged as to provide for lapped, or so-called "mashed-lapped" welds, by utilizing features such as disclosed in United States patent to Rudd, No. 2,886,691, granted May 12, 1959, and United States application of Wallace C. Rudd, Serial No. 794,625, filed February 20, 1959.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding together the edges of gaps in a succession of tubular members of finite length comprising: a tapered mandrel having a longitudinal gap therein; means for feeding in pressure engagement with and along said mandrel toward its smaller end, a succession of said members with the gaps therein aligned along between the edges of the gap in the mandrel; the gaps in the members, due to the taper of the mandrel, collectively forming a narrow elongated V-shaped gap with its apex at a weld point; pressure rollers respectively for engaging opposite sides of the members as they pass such weld point; and means for applying high frequency heating current to the edges of said V-shaped gap in advance of the weld point for heating each point thereon to welding temperature upon reaching the weld point.

2. Apparatus for welding seams along opposed edges on a succession of pairs of metal portions, such edges having gaps therebetween, the apparatus comprising in combination: a mandrel having a longitudinal gap therein, such mandrel being tapered with the smaller end thereof forward; means for advancing a succession of said pairs of metal portions in pressure engagement with and along on said mandrel with each of said pairs engaging the next under pressure and with the gaps between said edges located along between the edges of the gap in the mandrel; the gaps between the succession of the pairs of metal portions, due to the taper of the mandrel, collectively forming a narrow elongated V-shaped gap having its apex at a weld point in the region of the smaller forward end of the mandrel; means at opposite sides of the mandrel for pressing said metal portions to bring their edges firmly together as they reach such weld point; and means for applying high frequency current to flow along the edges of such V-shaped gap in advance of the weld point for heating each point thereon up to welding temperature upon reaching the weld point.

3. Apparatus for welding together the edges of gaps in a succession of tubular members of finite length comprising: a tapered mandrel having a longitudinal gap therein; caterpillar-type belt means for feeding in pressure engagement with and along said mandrel toward its smaller end, a succession of said members with the gaps therein aligned along between the edges of the gap in the mandrel, and the gaps in the members, due to the taper of the mandrel, collectively forming a narrow V-shaped gap with its apex at a weld point; means for applying high frequency heating current to the edges of said V-shaped gap in advance of the weld point for heating each point thereon to welding temperature upon reaching the weld point; and pressure roller means for engaging the members as they pass such weld point to force the edges of the gaps therein into a forged welded relationship.

4. Apparatus for welding together the edges of gaps in a succession of tubular members of finite length comprising: a tapered mandrel having a longitudinal gap therein; caterpillar-type belt means for feeding in pressure engagement with and along said mandrel toward its smaller end, a succession of said members with the gaps therein aligned along between the edges of the gap in the mandrel, and the gaps in the members, due to the taper of the mandrel, collectively forming a narrow V-shaped gap with its apex at a weld point; means for applying high frequency heating current to the edges of said V-shaped gap in advance of the weld point for heating each point thereon to welding temperature upon reaching the weld point; pressure roller means for engaging the members as they pass such weld point to force the edges of the gaps therein into a forged welded relationship; and means for driving said belt means with a speed sufficient to crowd the succession of members forward against resistance due to engagement of the members with said roller means.

5. Apparatus in accordance with the foregoing claim 2 and in which a tapered seam guide is provided in a position whereby its opposite sides are slidably engaged by the edges of the metal portions as same advance along said V-shaped gap.

References Cited in the file of this patent

UNITED STATES PATENTS

| | | |
|---|---|---|
| 1,209,704 | Hawes | Dec. 26, 1916 |
| 2,922,019 | Rudd | Jan. 19, 1960 |

FOREIGN PATENTS

| | | |
|---|---|---|
| 991,435 | France | June 20, 1951 |